United States Patent [19]
Ito

[11] Patent Number: 5,942,878
[45] Date of Patent: Aug. 24, 1999

[54] METHOD AND DEVICE FOR REDUCING MEMORY EFFECT OF BATTERY

[75] Inventor: Masaki Ito, Iwata, Japan

[73] Assignee: Yamaha Hatsudoki Kabushiki Kaisha, Iwata, Japan

[21] Appl. No.: 08/913,677

[22] PCT Filed: Jan. 27, 1997

[86] PCT No.: PCT/JP97/00170

§ 371 Date: Sep. 9, 1997

§ 102(e) Date: Sep. 9, 1997

[87] PCT Pub. No.: WO97/27659

PCT Pub. Date: Jul. 31, 1997

[30] Foreign Application Priority Data

Jan. 26, 1996 [JP] Japan .................................. 8-011962

[51] Int. Cl.$^6$ ........................................................ H02J 7/00
[52] U.S. Cl. ................................. 320/131; 320/DIG. 21
[58] Field of Search .................................... 320/131, 132, 320/DIG. 19, DIG. 21

[56] References Cited

U.S. PATENT DOCUMENTS 5,561,362  10/1996  Kawamura et al. ..................... 320/134
5,650,712   7/1997  Kawai et al. .................... 320/DIG. 21
5,717,256   2/1998  Okumura et al. ................ 320/DIG. 21

*Primary Examiner*—Peter S. Wong
*Assistant Examiner*—Lawrence Luk
*Attorney, Agent, or Firm*—Knobbe, Martens, Olson & Bear LLP

[57] ABSTRACT

According to the invention, the discharge depth representing the ratio of discharged capacity relative to the rated discharge capacity of a battery is divided into a plurality of ranges with each range allocated with the number of charges at which a refresh discharge should be carried out. The discharge depth is obtained as a sum of discharged capacity between one charge and the next. At the time of charging, summing up the count of the number of charges in the corresponding range according to the discharge depth is repeated until the number of charges in any of the ranges reaches the number at which the refresh discharge should be carried out. Then the refresh discharge is carried out either automatically or manually. Since the discharge depth is divided into a plurality of ranges with each range allocated with the number of charges at which the refresh discharge should be carried out and the refresh discharge is carried out when the number of charges in any of the ranges reaches the allocated number, the refresh discharge is carried out at an appropriate timing at which the effect of the refresh discharge is most efficiently used either automatically or manually so that the influence of the memory effect is effectively and efficiently reduced.

6 Claims, 3 Drawing Sheets

METHOD AND DEVICE FOR REDUCING MEMORY EFFECT OF BATTERY

TECHNICAL FIELD

This invention relates to method and device for reducing memory effect of batteries mounted as a power source on, for example, an electric motor-operated vehicle.

TECHNICAL BACKGROUND

Batteries mounted as a power source on, for example, an electric motor-operated vehicle include the alkaine secondary battery or the like. When such batteries are used with repeated charge-discharge cycles without using up their battery capacity 100% (rated capacity), the discharge ends as shown in FIG. 3 within a period of time which is shorter than that of previous discharge. In the worst case, the battery voltage reaches a discharge end voltage before discharging almost no charge.

Such a phenomenon in which the discharge comes to an end in a shorter period of time than previously possible when the battery is used with repeated charge-discharge cycles without using up 100% of the battery capacity is known as the memory effect. To avoid such a situation, the battery capacity must be used up almost 100%. Practically the memory effect is reduced by discharging the battery at a relatively small current, for example 0.1 to 0.2 CA.

That is to say, a refresh discharge at a small current should be carried out when the discharge time (usable time of the battery) has become short. However, the decision on the timing when the refresh discharge should be carried out is up to general users and so it is not clear what timing is effective and efficient for reducing the memory effect. As a result, in most cases the refresh discharge is not effective.

The object of the invention made in view of the above is to provide method and device for reducing the memory effect of the battery by carrying out the refresh discharge at an appropriate timing either automatically or manually upon receiving an alarm to reduce the influence of the memory effect effectively and efficiently.

SUMMARY OF THE INVENTION

According to this method of the invention for reducing the memory effect of batteries, the discharge depth representing the ratio of discharged capacity relative to the rated discharge capacity of a battery is divided into a plurality of ranges with each range allocated with the number of charges at which a refresh discharge should be carried out. The discharge depth is obtained as a sum of discharged capacity between one charge and the next. At the time of charging, summing up the count of the number of charges in the corresponding range according to the discharge depth is repeated until the number of charges in any of the ranges reaches the number at which the refresh discharge should be carried out. Then the refresh discharge is carried out either automatically or manually. Since the discharge depth is divided into a plurality of ranges with each range allocated with the number of charges at which the refresh discharge should be carried out and the refresh discharge is carried out when the number of charges in any of the ranges reaches the allocated number, the refresh discharge is carried out at an appropriate timing at which the effect of the refresh discharge is most efficiently used either automatically or manually so that the influence of the memory effect is effectively and efficiently reduced.

Also, an alarm is given when the number of charges at which the refresh discharge should be carried out is reached. When the refresh discharge is carried out automatically, the alarm of carrying out the refresh discharge is to call the user's attention that the user's manner of carrying out the refresh discharge is inappropriate. When the refresh discharge is carried out manually, the manual operation is carried out upon an alarm of the refresh discharge.

The memory effect reducing device for storage batteries of the invention comprises; refresh discharge setting means for dividing the discharge depth representing the ratio of discharged capacity relative to the rated capacity of the storage battery into a plurality of ranges and allocating the number of charges to each of the ranges at which number the refresh discharge should be carried out, discharged capacity summing means for summing up the discharged capacity between one charge and the next, discharge depth calculation means for calculating the discharge depth from the summed up discharged capacity of the battery and the rated capacity of the storage battery, number of charges counting means for repeating counting the number of charges for the corresponding range according to the discharge depth at the time of charging, and refresh discharge carrying out determination means for carrying out the refresh discharge either automatically or manually when the number of charges at which the refresh discharge should be carried out is reached in any of the ranges. The discharge depth is divided into a plurality of ranges, the number of charges at which a refresh discharge should be carried out is allocated to each of the ranges, and the refresh discharge is carried out when the number of charges reaches the allocated number. As a result, the refresh discharge is carried out at an appropriate timing at which the effect of carrying out the refresh discharge is most efficiently given either automatically or manually so that the influence of the memory effect is effectively and efficiently reduced.

Also, alarm means is provided for giving an alarm when the number of charges at which the refresh discharge should be carried out is reached. When the refresh discharge is carried out automatically, the alarm of carrying out the refresh discharge is to call the user's attention that the user's manner of carrying out the refresh discharge is inappropriate. When the refresh discharge is carried out manually, the manual operation is carried out upon alarm of the refresh discharge.

DESCRIPTION OF THE PREFERRED EMBODIMENTS

Figure 1:
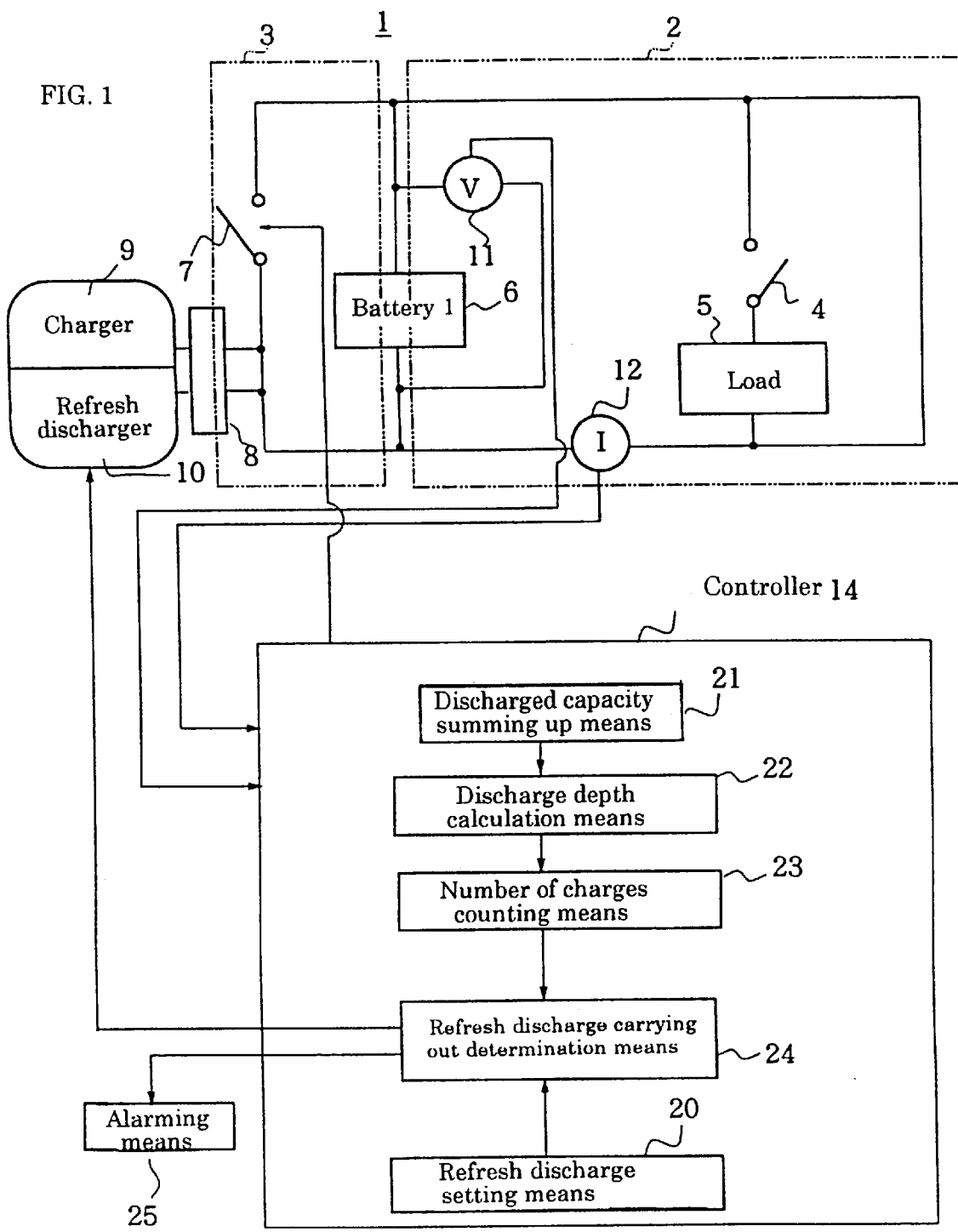
FIG. 1 is a block diagram roughly showing a constitution of a memory effect reducing device for storage batteries.
Figure 2:
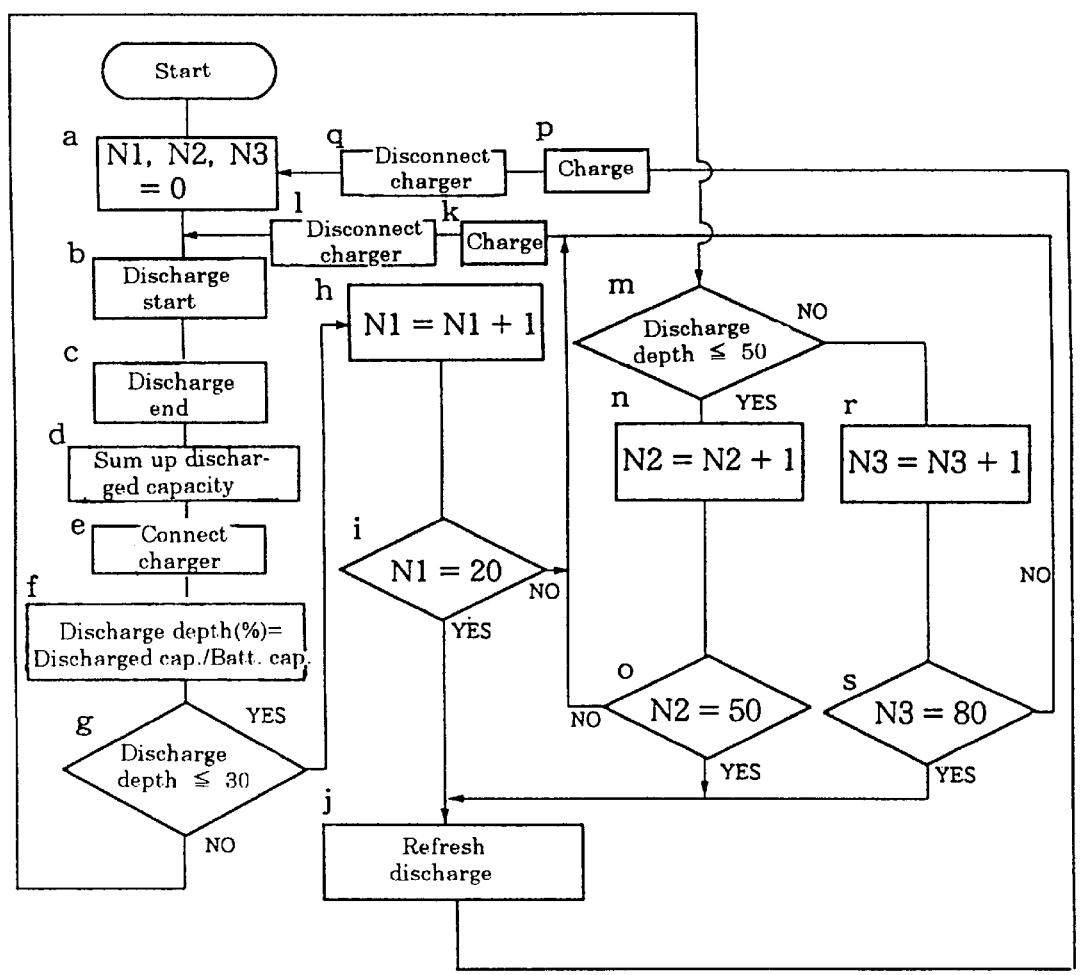
FIG. 2 is a flow chart of a memory effect reducing device for a storage batteries.

Embodiments of method and device for reducing the memory effect will be hereinafter described in reference to the appended drawings.

A memory effect reducing device 1 for storage batteries reduces the memory effect in a storage battery 6 mounted on an electric motor-operated vehicle such as an electric motor-assisted bicycle. To the storage battery 6 are connected a vehicle-mounted load circuit 2 and a charge circuit 3. The load circuit 2 is provided with a manual load circuit switch 4 and a load 5 including an electric motor. When the load switch 4 is closed, power is supplied from the storage battery 6 to the load 5. The storage battery 6 is an alkaline secondary battery for example of an Ni-MH or Ni—Cd type.

The charge circuit 3 is provided with a charge circuit switch 7. The charge circuit 3 carries out a charge to or a refresh discharge from the storage battery 6 when the electric motor-operated vehicle is stopped for example at night and the storage battery 6 is connected through a connector 8 to a charger 9 having a refresh discharger 10 and the vehicle-mounted controller 14 closes the charge circuit switch 7.

The memory effect reducing device 1 for storage batteries is also provided with a battery voltage detector 11 for detecting the voltage of the storage battery 6. The load circuit 2 is also provided with a discharge current detector 12. Voltage information obtained from the battery voltage detector 11 and current information obtained from the discharge current detector 12 is sent to the controller 14.

The controller 14 is provided with refresh discharge setting means 20, discharged capacity summing means 21, discharge depth calculation means 22, number of charges counting means 23, and refresh discharge carrying out determination means 24.

The refresh discharge setting means divides the discharge depth (DD) representing the ratio of actual discharge capacity of the storage battery 6 to the rated capacity of the storage battery 6 into a plurality of ranges, sets and stores the number of charges at which a refresh discharge should be carried out for each of the ranges. The discharged capacity summing means 21 calculates the total discharged capacity of the storage battery 6 by summing up the discharged capacity between one charge and the next using information obtained from the discharge current detector 12. The discharge depth calculation means 22 stores the total discharged capacity of the storage battery 6 obtained from the discharged capacity summing means 21 and calculates the discharge depth or the ratio of the total discharged capacity to the rated capacity of the storage battery 6. The number of charges counting means 23 repeats counting the number of charges in the corresponding range according to the calculated discharge depth value. The refresh discharge carrying out determination means 24 automatically carries out a refresh discharge when the number of charges at which the refresh discharge should be carried out is reached in any of the ranges.

Figure 3:
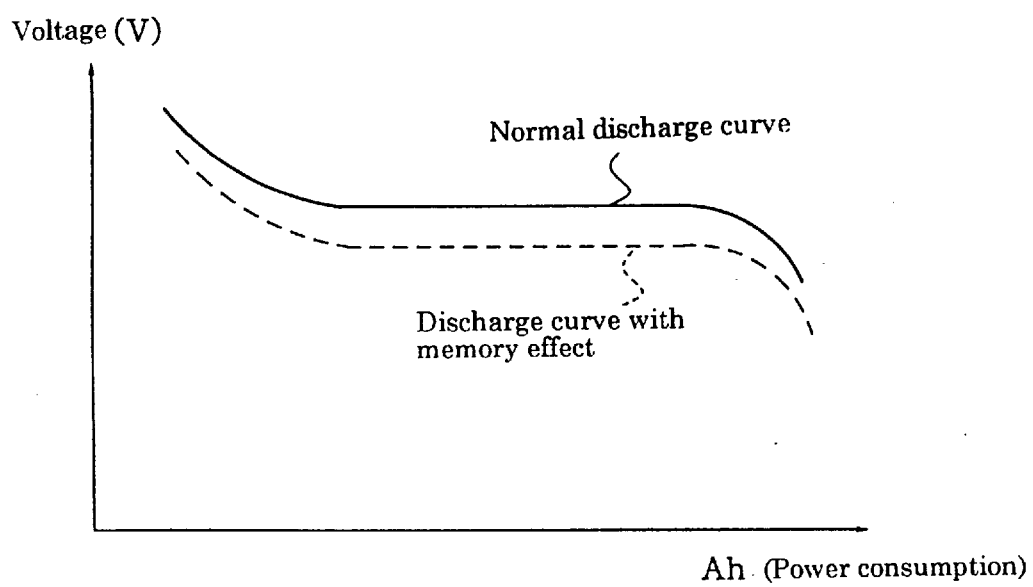
FIG. 3 illustrates the memory effect of storage batteries.

The memory effect reducing device 1 for storage batteries obtains the total discharged capacity of the storage battery 6 by summing up the discharged capacity between one charge and the next, stores the total discharged capacity, calculates the discharge depth representing the ratio of the total discharged capacity to the rated capacity, repeats summing the number of charges in the corresponding range according to the calculated discharge depth, and carries out the refresh discharge by actuating the refresh discharger 10 automatically when the number of charges at which the refresh discharge should be carried out is reached. Thus, the refresh discharge is carried out efficiently at the most appropriate timing. Also, carrying out the refresh discharge minimizes the influence of the memory effect shown in FIG. 3 of the storage battery 6.

The memory effect reducing device 1 for storage batteries is also provided with alarm means 25 for giving an alarm to carry out the refresh discharge when the number of charges at which the refresh discharge should be carried out is reached. The alarm means 25 may use for example a lamp, buzzer, or the like. Giving the alarm to carry out the refresh discharge serves as a caution or instruction to the user that the manner of carrying out the refresh discharge is inappropriate or that shallow charges and discharges are repeated.

Next, how the controller 14 controls the calculation of the discharge depth by summing up the discharged capacity will be described.

In this specific embodiment, the discharge depth is divided into three ranges; R1 from 0 to 30%, R2 from 30 to 50%, and R3 from 50 to 90%. To the three ranges are respectively allocated the numbers of charges at which a refresh discharge should be carried out. For example, to the range R1 is allocated the number of charges N1=20, to the range R2 is allocated N2=50, and to the range R3 is allocated N3=80. Namely, the shallower the repeated discharges, the earlier comes the refresh discharge timing. The allocated values are stored in the refresh discharge setting means 20.

In the step (a), N1, N2, and N3 are reset to zero. When the electric motor-operated vehicle is started to run, discharging the storage battery 6 is started in the step (b). When the running of the electric motor-operated vehicle is stopped and discharging is finished (step (c)), in the step (d), the discharged capacity is calculated with the discharged capacity summing means 21, and the total discharged capacity of the storage battery 6 is stored.

Next the charger 9 is connected to carry out charging (step (e)). In the step (f), discharge depth calculation means 22 calculates the discharge depth or the ratio of the total discharged capacity obtained from the discharge capacity summing means 21 to the rated capacity of the storage battery 6. In the step (g), a determination is made whether the discharge depth in the range R1 of 30% or less, and if yes, 1 is added to the number of charges N1 for the range R1.

A charge-discharge cycle of going to the step (k) for charging, disconnecting the charger 9 when the charging is finished (step (l)), and discharging (step (b)) is repeated until the number of charges reaches 20 (step (i)). When the number of charges reaches 20, a refresh discharge is carried out in the step (j). After the refresh discharge, charging is carried out in the step (p), and the charger 9 is disconnected (step (q)) after charging. The process goes to the step (a) and the above-described operation is carried out from the step (b).

In the step (g), a determination is made whether the discharge depth in the range R1 of 30% or less, and if no, the process goes to the step (m) in which a determination is made whether the discharge depth in the range R2 of 50% or less. If yes, 1 is added to the number of charges N2 for the range R2.

The charge-discharge cycle of going to the step (k) for charging, disconnecting the charger 9 when the charging is finished (step (l)), and discharging (step (b)) is repeated in the step (o) until the number of charges reaches 50. When the number of charges reaches 50, a refresh discharge is carried out in the step (j). After the refresh discharge, charging is carried out in the step (p), and the charger 9 is disconnected (step (q)) after charging. The process goes to the step (a) and the above-described operation is carried out from the step (b).

Also, in the step (m), if the determination for the range R2 of 50% or less results in the negative, 1 is added to the number of charges N3 for the range R3 in the step (r).

The charge-discharge cycle of going to the step (k) for charging, disconnecting the charger 9 when the charging is finished (step (l)), and discharging (step (b)) is repeated in the step (s) until the number of charges reaches 80. When the number of charges reaches 80, a refresh discharge is carried out in the step (j). After the refresh discharge, charging is carried out in the step (p), and the charger 9 is disconnected (step (q)) after charging. The process goes to the step (a) and the above-described operation is carried out from the step (b).

As described above, every charging operation is counted as 1 to be added to one of the numbers of charges N1, N2, and N3 for the range to which the present discharge depth belongs, and when any one of the N1, N2, and N3 reaches the number of charges at which the refresh discharge should be carried out, the refresh discharge is carried out. The refresh discharge reduces the influence of the memory effect in the storage battery 6. When a charging is carried out after the refresh discharge, the counts of N1, N2, and N3 are all reset to zero, the counting is started anew, and a refresh discharge is carried out when any of the counts N1, N2, and N3 fist reach the number of charges at which a refresh discharge should be carried out.

While the refresh discharge is carried out automatically in the above-described embodiment, a refresh discharge may be manually selected when an alarm is given. As described, the above embodiment is arranged that the discharged capacity is summed up in the step (d) every time the electric motor-operated vehicle is stopped and the discharge is finished, the total discharged capacity of the storage battery 6 is stored, and the charger 9 is connected. Only after that in the step (f), the discharge depth of the storage battery 6 is calculated as the ratio of the total discharged capacity of the storage battery 6 to the rated capacity of the battery 6. However, it may also be arranged that the total discharged capacity and also the discharge depth of the storage battery 6 which is the ratio of the total discharged capacity of the storage battery 6 to the rated capacity of the battery 6 are stored in advance every time the discharge is finished so that the determination is made whether the discharge depth in the range R1 of 30% or less in the step (g) as soon as the charger 9 is connected.

As described above, the device of the invention for reducing the memory effect of storage batteries using the method of the invention is mounted on electric motor-operated vehicles such as electric motor-assisted bicycles, divides the discharge depth into a plurality of ranges, presets the number of charges at which a refresh discharge should be carried out for each of the ranges, and the refresh discharge is carried out when the preset number of charges is reached in any of the ranges. Therefore, the refresh discharge may be carried out either automatically or manually at the most appropriate timing for utilizing the effect of the refresh discharge so that the influence of the memory effect is reduced effectively and efficiently.

What is claimed is:

1. A method of reducing the memory effect in storage batteries by effecting a refresh discharge at appropriate times during charging operations, said method comprising the steps of setting a discharge depth representing the ratio of discharged capacity of the storage battery to the rated capacity of the storage battery, allocating the discharge depths into a plurality of ranges, allocating the number of charges at which a refresh discharge should be carried out to each of the ranges, calculating the discharge depth by summing up the discharged capacity between one charge and the next, counting the number of charges upon each charge, and effecting a refresh discharge when the number of charges at which the refresh discharge should be carried out is reached.

2. A method of reducing the memory effect in storage batteries of claim 1, characterized in that an alarm is given to carry out a refresh discharge when the allocated number of charges for each range is reached.

3. A device for reducing the memory effect in storage batteries by effecting a refresh discharge during a charging operation, said device comprising refresh discharge setting means for setting a number of discharge depths each representing the ratio of discharged capacity relative to the rated capacity of the storage battery and dividing them into a plurality of ranges, means for setting the number of charges to each of the ranges at which number a refresh discharge should be carried out, discharged capacity summing means for summing up the discharged capacity between one charge and the next, discharge depth calculation means for calculating the discharge depth from the summed up discharged capacity of the storage battery and the rated capacity of the storage battery, counting means for counting the number of charges at the time of charging, and means for carrying out a refresh discharge when the number of charges at which the refresh discharge should be carried out is reached.

4. A device for reducing the memory effect in storage batteries of claim 3, further including alarm means for giving an alarm when the set number of charges is reached.

5. A method of reducing the memory effect in storage batteries of claim 1, characterized in that a refresh discharge is performed automatically when the allocated number of charges for each range is reached.

6. A device for reducing the memory effect in storage batteries of claim 3, further including automatic refresh discharge means for actuating said refresh discharge means when the set number of charges is reached.

* * * * *